United States Patent

[11] 3,581,639

| [72] | Inventor | Donald M. Harvey<br>Rochester, N.Y. |
|------|----------|-------------------------------------|
| [21] | Appl. No. | 767,096 |
| [22] | Filed | Oct. 14, 1968 |
| [45] | Patented | June 1, 1971 |
| [73] | Assignee | Eastman Kodak Company<br>Rochester, N.Y. |

[54] SHUTTER SYNCHRONIZED FLASH UNIT
2 Claims, 2 Drawing Figs.

[52] U.S. Cl. ........................................ 95/11.5, 240/1.3
[51] Int. Cl. ........................................ G03b 9/70, F21k 5/00
[50] Field of Search ........................... 95/11, 11.5; 431/91, 92, 93; 240/1.3

[56] References Cited
UNITED STATES PATENTS

| 590,204 | 9/1897 | Blackmore | 95/11.5 |
| 668,577 | 2/1901 | Fisher | 95/11.5 |
| 744,540 | 11/1903 | Hammer | 95/11.5 |
| 942,941 | 12/1909 | Smith | 95/11.5 |
| 970,358 | 9/1910 | Shoberg | 431/97 |
| 1,853,172 | 4/1932 | Neuwirth | 431/92 |
| 3,139,805 | 10/1962 | Peterson | 240/1.3(X) |

*Primary Examiner*—Samuel S. Matthews
*Assistant Examiner*—Robert P. Greiner
*Attorneys*—Robert W. Hampton, Daniel E. Sragow and John D. Husser

ABSTRACT: A camera for taking photographs using the illumination of a percussion-fireable flash lamp in which a portion of the shutter itself strikes the ignition tube or other firing means of the flash lamp for ignition thereof.

Patented June 1, 1971

3,581,639

DONALD M. HARVEY
INVENTOR.

BY *Daniel E. Sragow*
*R.W. Harrington*
ATTORNEYS

SHUTTER SYNCHRONIZED FLASH UNIT

CROSS-REFERENCES TO RELATED APPLICATIONS

Reference is made to copending U.S. application Ser No. 765,930, entitled "Multilamp Flash Unit," filed Oct. 8, 1968, in the name of David E. Beach.

BACKGROUND OF THE INVENTION

1. Field of the Invention

The present invention relates to flash photography and more particularly to a camera for use with percussion-ignitable photoflash units wherein the camera is adapted to operably support and ignite such units.

2. Description of the Prior Art

There previously has been developed a unitary package containing a plurality of photoflash lamps and individual reflectors such as disclosed, for example, in U.S. Pat. No. 3,244,087, issued on Apr. 5, 1966. In use, lamps in a package of this type are sequentially aligned with respect to the picture-taking axis of a camera and electrically ignited in synchronization with the actuation of the camera shutter.

More recently a similar multilamp photoflash unit has been developed which does not require application of an electrical potential for firing. In such units a primer charge in a metal tube that extends from the bottom of the lamp is ignited by a percussion and in turn ignites a combustible material and a combustion supporting gas sealed in the lamp envelope.

Although such a percussion ignitable flash unit offers an important advantage by precluding the necessity for an electrical ignition source, several problems have arisen in adapting this unit for reliable use with photographic apparatus.

Firstly, in order to synchronize the firing of the flashlamp with the opening of the shutter, mechanisms have been devised which first actuates opening of the shutter and then strike the ignition tube of the flashlamp. Such mechanisms have previously been complicated and expensive. Furthermore, the cocking of the various springs to both cause the shutter exposure and to subsequently cause the percussion-ignition of the primer tube of the flashlamp has necessitated additional complicated structure which additionally adds to the cost of the mechanism.

SUMMARY OF THE INVENTION

The present invention provides a simple and inexpensive mechanism which causes an exposure to be made, and during the exposure causes a percussion type flashlamp to be fired.

It is therefore an object of the invention to provide an improved photographic camera which is simple, but in which a percussion type of flashlamp can be reliably fired.

It is a further object of the invention to provide a camera shutter member which serves as a hammer to strike the ignition tube of the flashlamp in such a manner that the flashlamp is fired after the shutter has opened.

BRIEF DESCRIPTION OF THE DRAWING

The above and other objects and advantages of the present invention will become apparent to one skilled in the art from the following detailed description read in conjunction with the attached drawing wherein like reference numerals indicate like elements, and wherein.

DESCRIPTION OF PREFERRED EMBODIMENTS

Figure 1:
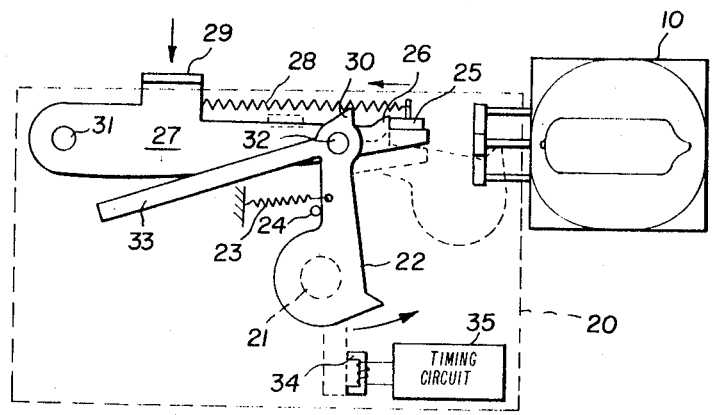
FIG. 1 is a schematic diagram of a combination shutter and lamp firing mechanism according to the invention together with an optional electronic mechanism for holding the shutter open.

Referring to FIG. 1, a flash unit 10 of the type which is percussion ignited and which is more fully described in the above commonly assigned U.S. application, is mounted in a known manner on a photographic apparatus 20, in this instance, a still camera. Camera 20 comprises an exposure aperture 21 which is normally covered by a capping member such as shutter blade 22. Shutter blade 22 is held in the position shown by the force of spring 23 which urges shutter blade 22 against stop pin 24.

When the camera is set to take an exposure, lever 25 is urged against shoulder 26 of shutter release member 27 by spring 28. In order to make an exposure, the operator depresses shutter release member 27 at position 29 in the direction shown by the arrow. When shutter release member 27 pivots about pin 31, shoulder 26 no longer holds lever 25. Lever 25 is therefore moved by spring 28 against projection 30 on shutter blade 22. Shutter blade 22 therefore pivots about pin 32 to the position shown in dotted lines while lever 25 moves to its position shown in dotted lines. When the shutter blade 22 moves to the position shown in dotted lines, it strikes the ignition tube or other firing member of the flashlamp thus firing it. Spring 23 then causes shutter blade 22 to return to its original exposure aperture covering position.

In order to recock the mechanism of FIG. 1 so as to make it ready for an exposure, lever 25 is cammed up over projection 30 and shoulder 26 by means (not shown) which are well known.

FIG. 1 further shows an optional feature of an electronic control for holding the shutter open. If desired shutter member 22 may be provided with an additional member 33 which is adapted to cooperate with electromagnet 34. Electromagnet 34 is energized by timing circuit 35. When the shutter blade 22 has uncovered exposure aperture 21, arm 33 comes in contact with electromagnet 34. As long as timing circuit 35 has energized electromagnet 34, the shutter will be held in an open position. When the timing circuit deenergizes electromagnet 34, the shutter will return to its closed position.

Figure 2:
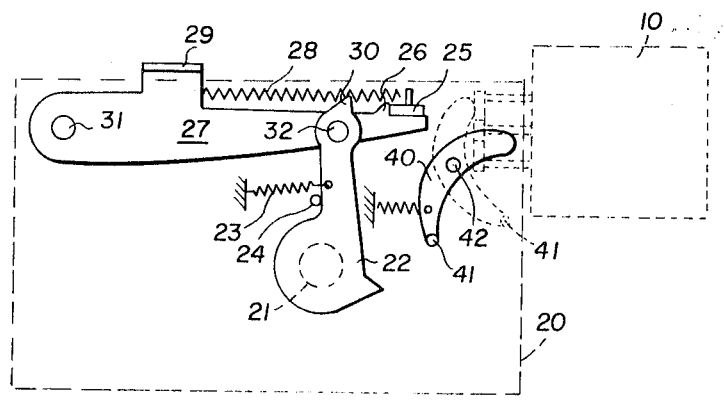
FIG. 2 is an alternative embodiment of the invention showing a mechanism for changing the shutter time for flash photography.

Referring to FIG. 2, there is shown an arrangement similar to that of FIG. 1 but wherein provision is made to automatically increase the shutter speed when flashlamp 10 is removed from the socket in the camera. Rocker 40 carries stop pin 41 which engages shutter blade 22 when in the position shown. Since the shutter blade travels a shorter distance when stop pin 41 is in its path, the time of exposure is substantially shortened. However, when a flashlamp 10 is inserted, rocker arm 40 pivots about point 42 to the position shown in dotted lines so that pin 41 is no longer in the path of shutter blade 22, and so that shutter blade 22 takes its full stroke to hit flashlamp 10 to fire it.

The invention has been described in detail with particular reference to preferred embodiments thereof, but it will be understood that variations and modifications can be effected within the spirit and scope of the invention.

I claim:

1. In a camera having means for receiving a flashlamp fireable by striking an impact receiving element located at a firing site and a shutter blade movable from a closed position to an open position to effect an exposure, the improvement comprising a striker connected to said shutter blade for movement therewith along a path to strike said impact receiving element during movement of said shutter blade to its open position.

2. In a camera having means for receiving a flashlamp fireable by striking an impact receiving element located at a firing site and a shutter blade movable from a closed position to an open position to effect an exposure, the improvement comprising a striking surface integral with said shutter blade and positioned to strikingly engage an impact receiving element located at said firing site as said blade moves to its open position.